US009749891B2

(12) United States Patent
Tomala et al.

(10) Patent No.: US 9,749,891 B2
(45) Date of Patent: Aug. 29, 2017

(54) SUSPENDING MINIMIZATION OF DRIVE TESTS (MDT) MEASUREMENTS

(71) Applicant: Nokia Solutions and Networks Oy, Espoo (FI)

(72) Inventors: Malgorzata Tomala, Wroclaw (PL); Benoist Pierre Sebire, Tokyo (JP); Yi Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/429,470

(22) PCT Filed: Sep. 19, 2012

(86) PCT No.: PCT/EP2012/068404
§ 371 (c)(1),
(2) Date: Mar. 19, 2015

(87) PCT Pub. No.: WO2014/044299
PCT Pub. Date: Mar. 27, 2014

(65) Prior Publication Data
US 2015/0223094 A1 Aug. 6, 2015

(51) Int. Cl.
*H04W 24/00* (2009.01)
*H04W 24/10* (2009.01)
*H04W 24/08* (2009.01)

(52) U.S. Cl.
CPC ............ *H04W 24/10* (2013.01); *H04W 24/08* (2013.01)

(58) Field of Classification Search
CPC .............................. H04W 72/10; H04W 24/00

USPC .......... 455/511, 512, 515, 69; 370/247, 251, 370/253, 322, 329, 330, 341, 348, 349, 370/395.2, 395.21, 395.3
See application file for complete search history.

(56) References Cited

U.S. PATENT DOCUMENTS

| 2011/0183661 | A1* | 7/2011 | Yi | H04W 24/10 455/422.1 |
| 2013/0053017 | A1* | 2/2013 | Chang | H04W 24/10 455/422.1 |
| 2013/0196650 | A1* | 8/2013 | Futaki | H04W 24/10 455/424 |

FOREIGN PATENT DOCUMENTS

EP    2 408 228 A1    1/2012

OTHER PUBLICATIONS

R2-106031; ETSI MCC; "Report of 3GPP TSG RAN WG2 meeting #71"; TSG-RAN Working Group 2 meeting #71bis; Xian, China, Oct. 11-15, 2010, (164 pages).

(Continued)

*Primary Examiner* — Ping Hsieh
(74) *Attorney, Agent, or Firm* — Harrington & Smith

(57) ABSTRACT

A method includes determining at a User Equipment (UE) that logged Minimization of Drive Tests measurements (MDT) is configured and thus a plurality of MDT measurements are to be made and results of said measurements are to be stored for reporting at a later time. It is determined that said measurements are to be stopped (suspended) for various reasons (such as the UE being in any cell selection mode or camping on any cell) and information indicating a reason why said measurements are to be stopped (suspended) is stored in the measurement log.

19 Claims, 5 Drawing Sheets

(56) References Cited

OTHER PUBLICATIONS

3GPP TS 36.300 V11.2.0 (Jun. 2012), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 201 pgs.
3GPP TS 36.304 V11.0.0 (Jun. 2012), "3$^{rd}$ Generation Partnership Project; Technical Specification Group Radio Access Network; Evolved Universal Terrestrial Radio Access (E-UTRA); User Equipment (UE) procedures in idle mode (Release 11)", 33 pgs.
3GPP TS 37.320 V11.0.0 (Jun. 2012), "3$^{rd}$ Generation Partnership Project; Technical Specification Group Radio Access Network; Universal Terrestrial Radio Access (UTRA) and Evolved Universal Terrestrial Radio Access (E-UTRA); Radio Measurement collection for Minimization of Drive Tests (MDT) Overall description; Stage 2 (Release 11)", 20 pgs.
3GPP TSG RAN WG2 #71, Madrid, Spain, Aug. 23-Aug. 27, 2010, R2-104548, "MDT Logging when Out of Service", Vodafone, 2 pgs.
3GPP TSG-RAN WG2 Meeting #77, Dresden, Germany, Feb. 6-10, 2012, R2-120056, "IDC Considerations for MDT", Nokia Siemens Networks, Nokia Corporation, 3 pgs.
3GPP TSG-RAN WG2 #78, Prague, Czeck, May 21-25, 2012, R2-122893, "Inter-RAT MDT", LG Electronics Inc., 2 pgs.

\* cited by examiner

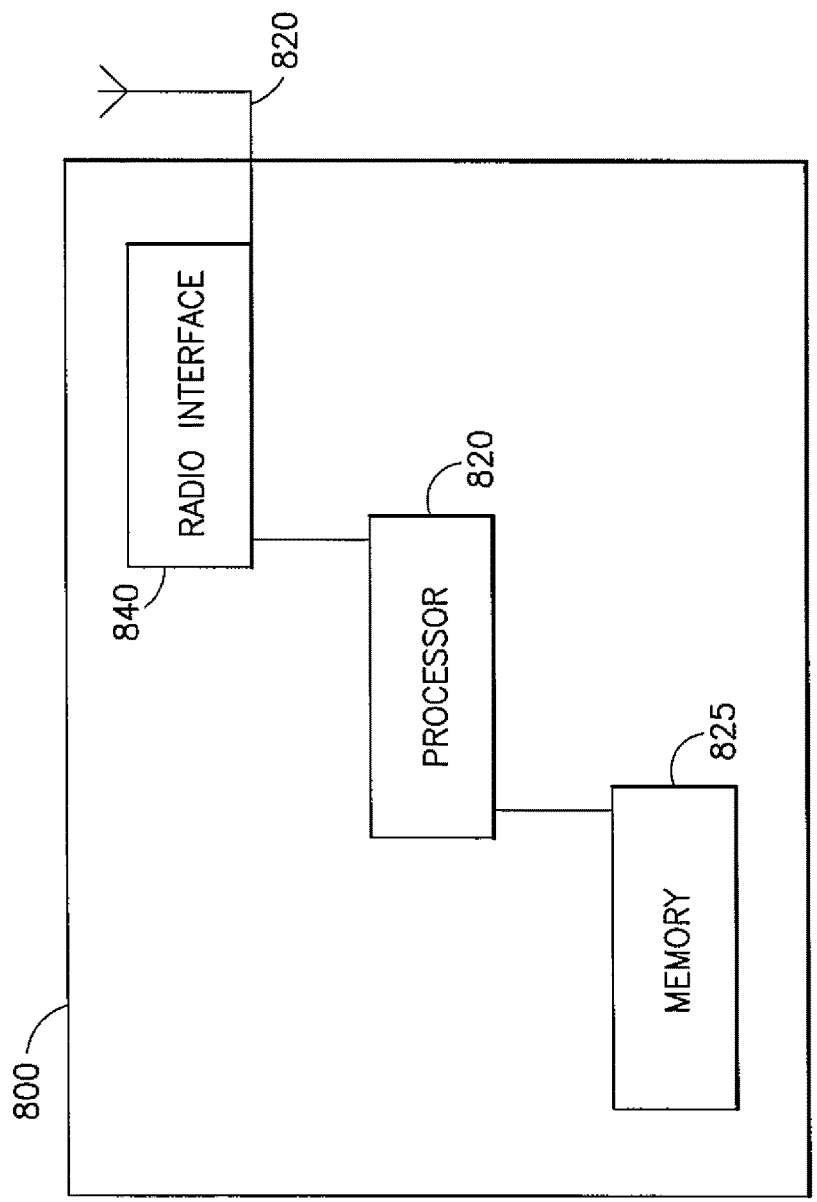

SUSPENDING MINIMIZATION OF DRIVE TESTS (MDT) MEASUREMENTS

Some embodiments relate to methods and apparatus and in particular but not exclusively to methods and apparatus for use in data collection.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text messages, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. A further development of the LTE is referred to as LTE-Advanced (LTE-A).

It has been proposed to provide automatic collection of different user equipment measurements to enable easier monitoring of the network performance. It is an aim to replace or minimize manual drive tests which were previously needed to be performed by operators by automatic collection. Two minimising of drive tests (MDT) reporting approaches have been provided. One is immediate MDT reporting. This involves connected user equipment performing in real-time operation. In other words, the user equipment reports MDT measurements immediately to the base station as soon as the MDT measurement has been performed. Another proposal is for logged MDT reporting. In this case, the user equipment will perform some MDT measurements. However, the user equipment will store these measurements to report them to the network at a later point in time.

According to a first aspect there is provided a method comprising: determining at a user equipment that a plurality of measurements are to be made and results of said measurements are to be stored for reporting at a later time; determining that said measurements are to be stopped; and storing information indicating a reason why said measurements are to be stopped.

The reason may be selected from a set of a plurality of different reasons.

The reason may be selected from one or more of: said user equipment is in an any cell selection mode; said user equipment is camped on any cell; another radio access technology has been selected; a connection is requested; a connection state changes; and in device coexistence interference is present.

The information may be stored in association with the result of a last measurement before the measurements are to be stopped.

The information may further comprise time information.

The information may further comprise information indicating a trigger for said reason.

The determining at the user equipment that a plurality of measurements is to be made may comprise determining that the user equipment has entered an idle mode.

Information indicating that said user equipment is to store said information indicating said reason as to why said measurements are to be stopped may be received.

Results of said measurements and said stored information may be reported to a base station.

The reporting may be in response to said user equipment entering a connected mode.

The measurements may comprise minimisation of drive test measurements.

The measurements may comprise logged minimisation of drive test measurements.

According to another aspect, there is provided a method comprising: receiving information about at least one measurement made by a user equipment and information indicating a reason why measurements by said user equipment were stopped.

Information indicating that said user equipment is to store said information indicating said reason as to why said measurements are to be stopped may be sent.

According to a another aspect there is provided an apparatus comprising at least one processor and at least one memory including computer code for one or more programs, the at least one memory and the computer code configured, with the at least one processor, to cause the apparatus at least to; determine that a plurality of measurements are to be made and results of said measurements are to be stored for reporting at a later time; determine that said measurements are to be stopped; and store information indicating a reason why said measurements are to be stopped.

The at least one memory and the computer code may be configured with the at least one processor to cause the apparatus to select said reason from a set of a plurality of different reasons.

The reason may be selected from one or more of: user equipment is in an any cell selection mode; user equipment is camped on any cell; another radio access technology has been selected; a connection is requested; a connection state changes; and in device coexistence interference is present.

The at least one memory and the computer code may be configured with the at least one processor to cause the apparatus to store said information in association with the result of a last measurement before the measurements are to be stopped.

The said information may further comprise time information.

The information may further comprise information indicating a trigger for said reason.

The at least one memory and the computer code may be configured with the at least one processor to cause the apparatus to determine that a plurality of measurements are to be made by determining that a user equipment has entered an idle mode.

The at least one memory and the computer code may be configured with the at least one processor to cause the apparatus to receive information indicating that said information indicating said reason as to why said measurements are to be stopped is to be stored.

The at least one memory and the computer code may be configured with the at least one processor to cause the apparatus to report said results of said measurements and said stored information to a base station.

The at least one memory and the computer code may be configured with the at least one processor to cause the apparatus to report in response to a user equipment entering a connected mode.

The measurements may comprise minimisation of drive test measurements.

The measurements may comprise logged minimisation of drive test measurements.

According to another aspect there is provided an apparatus comprising: means for determining that a plurality of measurements are to be made and results of said measurements are to be stored for reporting at a later time; means for determining that said measurements are to be stopped; and means for storing information indicating a reason why said measurements are to be stopped. The apparatus may be in a user equipment.

The reason may be selected from a set of a plurality of different reasons.

The reason may be selected from one or more of: a user equipment in any cell selection mode; a user equipment is camped on any cell; another radio access technology has been selected; a connection is requested; a connection state changes; and in device coexistence interference is present.

The storing means may be for storing said information in association with the result of a last measurement before the measurements are to be stopped.

The information may further comprise time information.

The information may further comprise information indicating a trigger for said reason.

The determining means for determining that a plurality of measurements is to be made may be for determining that a user equipment has entered an idle mode.

The apparatus may comprise means for receiving information indicating that said information indicating said reason as to why said measurements are to be stopped is to be stored.

The apparatus may comprise means for reporting the results of said measurements and said stored information to a base station.

The reporting means may be responsive to a user equipment entering a connected mode.

The measurements may comprise minimisation of drive test measurements.

The measurements may comprise logged minimisation of drive test measurements.

A user equipment may comprise any of the above described apparatus.

According to another aspect, there is provided an apparatus comprising at least one processor and at least one memory including computer code for one or more programs, the at least one memory and the computer code configured, with the at least one processor, to cause the apparatus at least to; receive information about at least one measurement made by a user equipment and information indicating a reason why said measurements were stopped.

The at least one memory and the computer code may be configured with the at least one processor to cause the apparatus to send information indicating that said user equipment is to store said information indicating said reason as to why said measurements are to be stopped.

According to another aspect, there is provided an apparatus comprising: means for receiving information about at least one measurement made by a user equipment and information indicating a reason why said measurements were stopped.

The apparatus may comprise means for sending information indicating that said user equipment is to store said information indicating said reason as to why said measurements are to be stopped.

A base station may comprise the apparatus.

According to another aspect, there is provided a method comprising: determining at a user equipment that an event has occurred; and storing information relating to an associated measurement sample and information indicating said event.

According to another aspect, there is provided a method comprising: determining at a user equipment that an event has occurred and responsive to said event determining that a plurality of measurements are to be made; and storing information relating to said measurements and information indicating said event.

According to another aspect, there is provided an apparatus comprising: means for determining at a user equipment that an event has occurred; and means for storing information relating to an associated measurement sample and information indicating said event.

According to another aspect, there is provided an apparatus comprising: means for determining at a user equipment that an event has occurred and responsive to said event determining that a plurality of measurements are to be made; and means for storing information relating to said measurements and information indicating said event.

According to another aspect, there is provided an apparatus comprising at least one processor and at least one memory including computer code for one or more programs, the at least one memory and the computer code configured, with the at least one processor, to cause the apparatus at least to: determine at a user equipment that an event has occurred; and store information relating to an associated measurement sample and information indicating said event.

According to another aspect, there is provided an apparatus comprising at least one processor and at least one memory including computer code for one or more programs, the at least one memory and the computer code configured, with the at least one processor, to cause the apparatus at least to: determine at a user equipment that an event has occurred and responsive to said event determining that a plurality of measurements are to be made; and store information relating to said measurements and information indicating said event.

A computer program may comprise computer executable code which when run may cause any of the above methods to be performed.

Some embodiments will now be described, by way of example only, with reference to the following examples and accompanying drawings in which.

Figure 4:
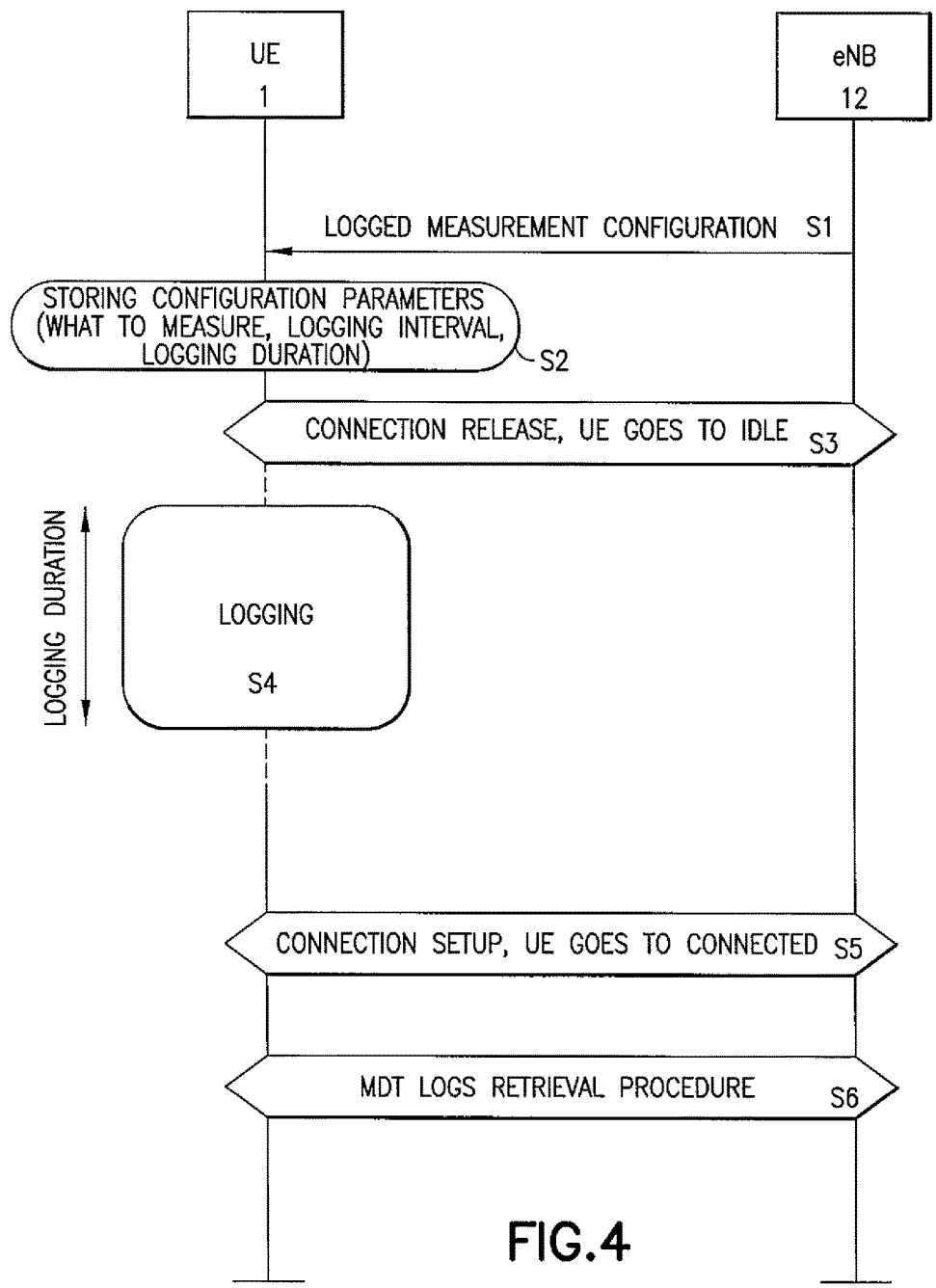
Figure 5:
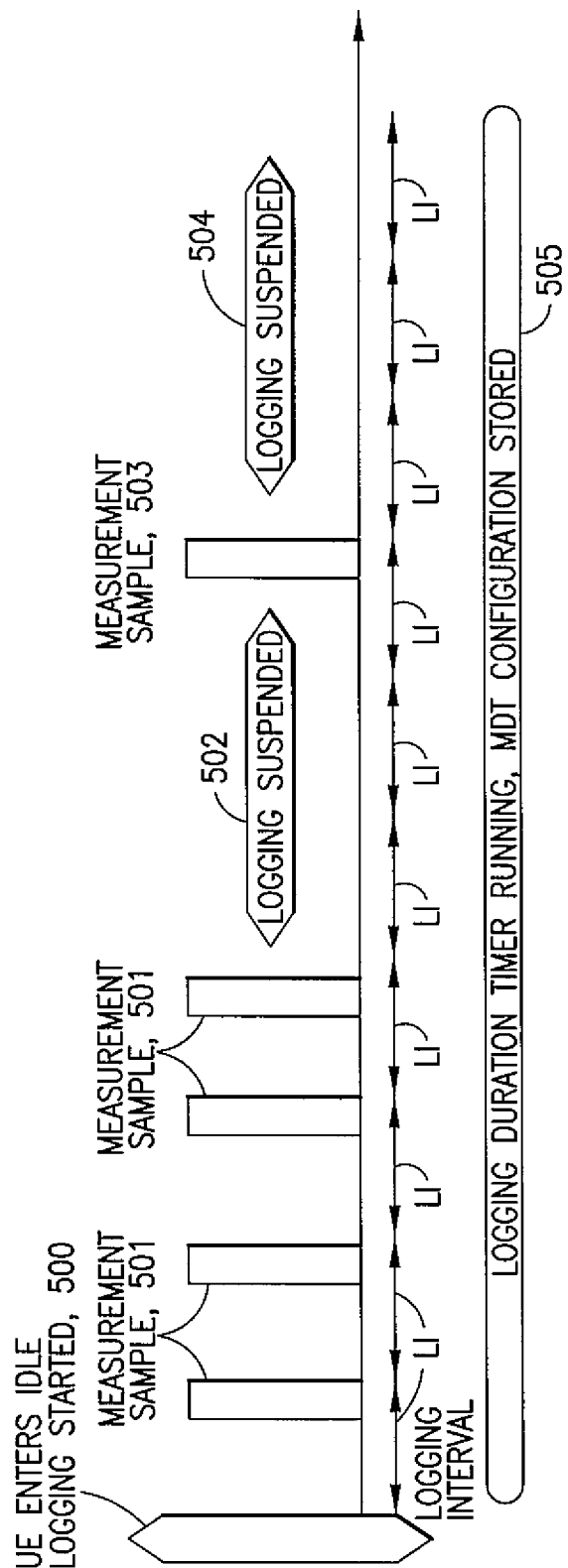
Figure 6:
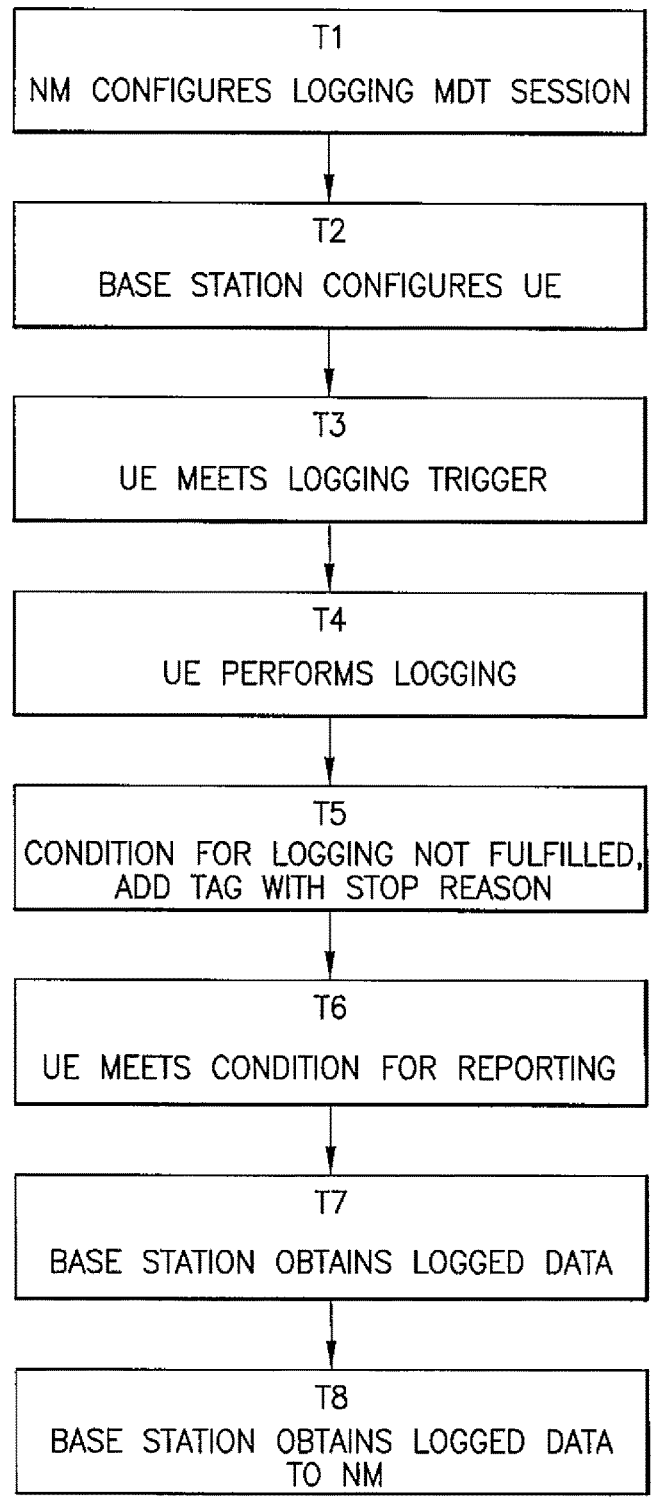

FIG. 3 schematically shows a base station;

FIG. 4 shows a method flow for logged MDT reporting;

FIG. 5 schematically shows the measurements made during a logging duration; and FIG. 6 shows a method flow of an embodiment.

In the following description certain exemplifying embodiments are explained with reference to wireless or mobile communication systems serving mobile communication devices. A wireless communication system and mobile communication device are briefly explained with reference to FIGS. 1 and 2.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via an access node such as at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
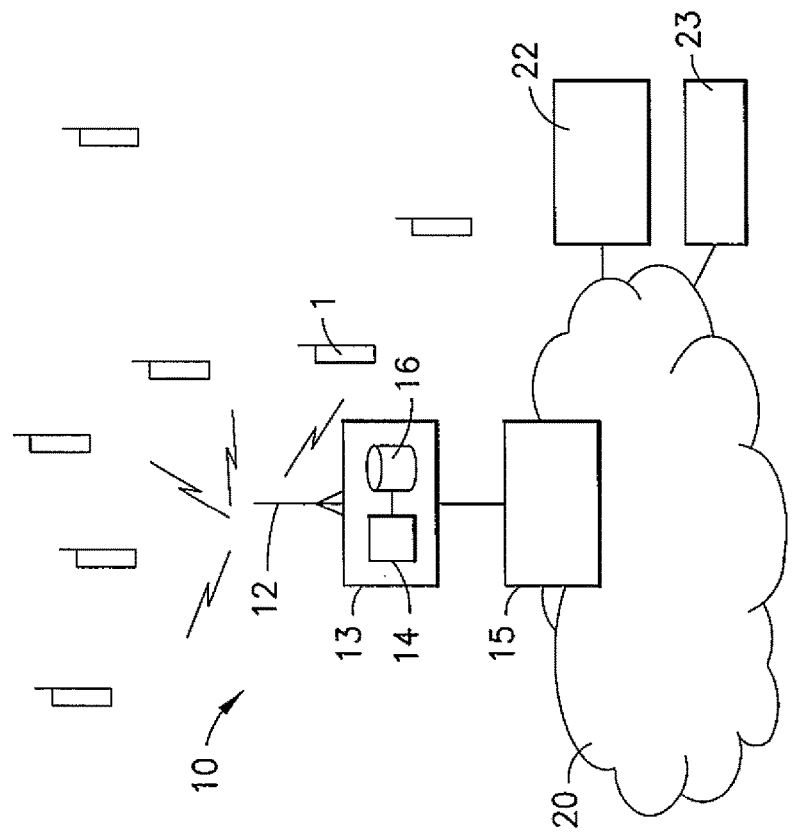
FIG. 1 shows an example of a communication system in which some embodiments of the may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory 16, at least one data processing unit 14 and an input/output interface. The controller may be provided with memory capacity and at least one data processor. It shall be understood that the control functions may be distributed between a plurality of controller units. The controller apparatus for a base station may be configured to execute an appropriate software code to provide the control functions as explained below in more detail. The control entity may be separate from or part of the base station.

In the example shown in FIG. 1, the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks. In some embodiments the base station node is a Node B or an eNodeB.

A trace collection entity TCE 22 is provided. In FIG. 1, the trace collection entity is shown as being connected via the data network. However, in alternative embodiments, the trace collection entity may be arranged to communicate more directly with the controller 13 and/or may be part of the same network as the controller.

An OAM entity 23 is shown as being connected to the data network. The operation administration and maintenance OAM entity 23 may be provided elsewhere in the system. The OAM entity may be arranged to communicate with one or more networks. The OAM entity may be arranged to receive information from the TCE 22. The OAM entity and the TCE entity may be provided by a common entity or entities.

In some embodiments, the OAM may alternatively or additionally be configured to communicate more directly with the base stations.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
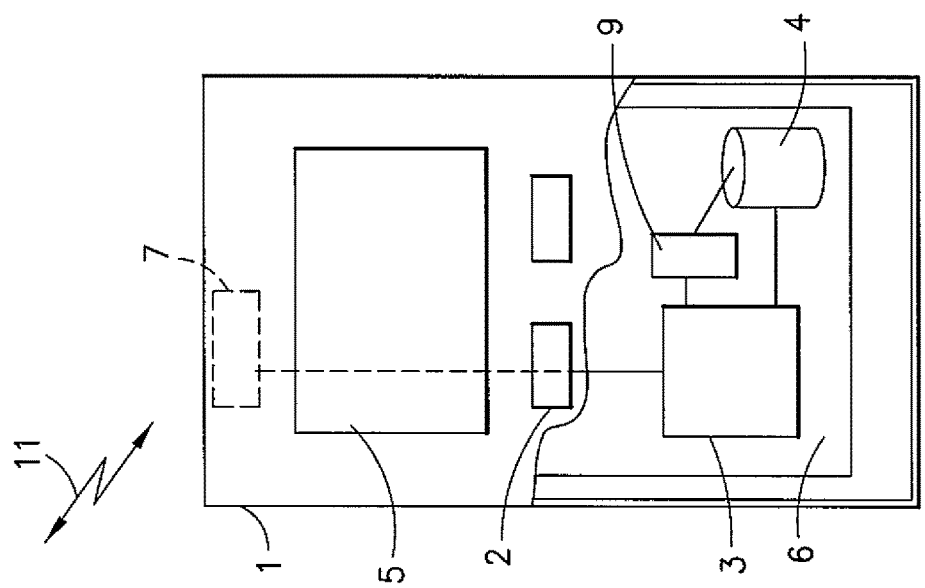
FIG. 2 shows an example of a communication device.

FIG. 2 shows a schematic, partially sectioned view of a communication device 1 that can be used for communication on carrier 11 with at least one other wireless station. An appropriate mobile communication device may be provided by any device capable of sending and receiving radio signals. Such a communication device may be referred to as a user equipment UE. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like. The communication device or UE may change its position, but in some embodiments be also stationary and generally fixed in position.

A communication device may be used for voice and video calls and/or for accessing service applications provided via a data network. The device 1 may receive signals via appropriate apparatus for receiving and transmitting radio signals on wireless carriers, or radio bearers.

In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Some embodiments may be implemented in an LTE system, for example the LTE-A system. Of course other embodiments may be used with other releases of the LTE standard. Yet further embodiments may be used with the standards other than the LTE standard.

It has been proposed to provide automatic collection of different user equipment measurements to enable easier monitoring of the network performance. It is an aim of some embodiments to replace manual drive tests which previously needed to be performed by operators by automatic collection.

Minimisation of drive tests MDT may enable the operator to use the existing subscriber (user equipment) population for network optimisation. In the 3GPP MDT has been developed for coverage optimisation or any further optimization of the network. For example, coverage mapping may be considered to identify weak signal areas, coverage holes, pilot pollution or similar.

The operation administration and maintenance (OAM) entity initiates an MDT job to the base station. According to the MDT configuration associated with that job, the base station will configure the user equipment to, periodically or when a certain event happens, report measurements optionally along with the location coordinates. The measurement reports may be RSRP/RSRQ (reference signal received power/reference signal received quality) measurements. The location coordinates may be obtained by for example GNSS or in any suitable manner. The radio access network may collect this information into trace files and send these trace files to a trace collection entity (TCE) for processing. MDT may also support additional functions. For example, MDT may be used for uplink coverage optimisation, determining the cause of weak uplink coverage, and/or uplink/down link throughput mapping.

Two MDT reporting approaches have been provided. One is immediate MDT reporting. This involves connected user equipment performing in real-time operation. In other words, the user equipment reports MDT measurements immediately to the base station as soon as the MDT measurement has been performed.

Another approach is logged MDT reporting. In this case, the user equipment will perform some MDT measurements. However, the user equipment will store these measurements to report them to the network at a later point in time. These measurement results may be sent to the network when, for example, requested by the network. This logging activity may take place when the user equipment is in an idle state. When user equipment is in the idle state, the user equipment will have no active connection to the network. Thus, the network will have no control over the user equipment while it is performing the logging, if the user equipment is in the idle mode. When the user equipment changes from the idle mode to the active or connected mode, the user equipment will indicate to the network the availability of the stored logged MDT reports. When the network gets this information, the network will cause the user equipment to report the logged MDT reports to the network.

The logged measurement configuration for logged MDT is configured by the network and provided to the user equipment in advance of the measurement. This configuration is signalled by normal dedicated radio resource control (RRC) procedures which a user equipment receives when it is connected to the network and before the user equipment goes into the idle mode. The logged measurement configuration is stored by the user equipment and is activated when the user equipment goes into the idle mode. Thus, once the connection is released, the user equipment enters the idle state. The user equipment will then perform the logged MDT measurements in accordance with the logged measurement configuration. The measurement results are stored locally and these results may be reported to the network when the user equipment goes to the active or connected mode.

In this regard, reference is made to FIG. 4. FIG. 4 shows the signal flow between a user equipment 1 and base station 12. In this example, the base station is an eNB 12.

The base station 12 sends in step S1, the logged measurement configuration to the user equipment 1.

In step S2, the user equipment stores the configuration parameters of the logged measurement configuration. The configuration parameters may include one or more of what to measure, logging interval and logging duration.

In step S3, the connection between the user equipment and the base station is released and the user equipment goes into the idle mode.

In step S4, the user equipment performs the required measurements as defined in the logged measurement configuration and stores the results of those measurements. These results are the stored MDT logs.

In step S5, the connection between the user equipment and base station is set up and the user equipment goes into the connected mode. While transiting the user equipment may indicate MDT logs availability.

In step S6, the MDT logs stored in the user equipment are provided to the base station.

In some embodiments, the logging activity requires periodic reporting of preconfigured measurements. These preconfigured measurements may for example be RSRP (reference signal received power) and/or RSRQ (reference signal received quality) measurements. In some embodiments, this should result in reports consisting of log samples recorded at regular time intervals. Each log sample may be time stamped.

However, there may be a problem that during the idle period of the user equipment, the logging activity may be interrupted due to one or more of the following reasons.

The logging may be suspended since the user equipment enters a so-called coverage hole. If no suitable cell is found during the cell the selection phase, the user equipment will enter an any cell selection state. This may be as defined in the 3GPP standard TS36.304.

The user equipment may camp on any cell with only limited services supported. For example, the idle user equipment cannot find a suitable cell and has to do any cell selection This may be as defined in the 3GPP standard TS36.304. Once the user equipment finds an acceptable cell, the user equipment will camp on it. For example, this may occur when the user equipment enters another RAT (radio access technology)/PLMN area or the coverage area of a CSG (closed subscriber group) cell that cannot be accessed because the user equipment is not a member. This may be as defined in the 3GPP standard TS36.300. The logged MDT may be suspended when the user equipment is in the camp on any cell state.

Both of the above mentioned states result from different triggers, for example no suitable cell found, registration on PLMN rejected, no acceptable cell found or the like. This means that besides a lack of continuity in the logs caused by not being normally camped, determination for the reason causing the break in logging is more complex.

Another issue may arise if the user equipment changes the RAT. The user equipment may have only one MDT context (i.e. for one RAT). If configured in the E-UTRA (evolved UMTS terrestrial radio access) the UE will log radio measurement results only when attached to E-UTRA and staying in idle mode. In some embodiments when the UE is nearby the E-UTRA border, this may trigger also other measurements than E-UTRA (other RATs can be recorded as neighbouring cells measurement results though). When the user equipment encounters the E-UTRA border, the user equipment may detect another RAT where the radio conditions are better and consequently the user equipment camps normally on other RAT's cell. The E-UTRA configuration is not effective in other RAT and accordingly the UE is not able to carry out the MDT measurements.

The user equipment may enter the connected state either in the RAT in which the MDT is configured or a different RAT. If configured with logged configuration for idle state only, the UE will stop logging whenever leaving the idle state. However, the configuration is supposed to be running according to pre-determined logging time. The MDT configuration is sent to the UE with the logging duration time, e.g. 2 h. So the primary condition is to be in idle state. If the UE stays in idle for 2 h, the UE will log measurements for 2 h. However if in the meantime the UE enters another RAT or connected state (e.g. to perform a call), this will suspend logging.

The user equipment may of course encounter an internal problem. This may occur where for example the user equipment runs out of battery or out of memory.

It has also been proposed that while the user equipment is idle, if the user equipment experiences internal interferences from an ISM (industrial scientific and medical) band, if the UE is configured to perform logged MDT, it has been suggested that the user equipment would stop logging the interfered frequencies. This is to avoid in device coexistence interference IDC. This may be as outlined in for example, the 3GPP standard TS 36.318. When the user equipment detects a reason to suspend the logging, the configuration remains stored and the logging duration timer will continue to run. In consequence, the logging report will not contain continuity in the measurement samples and there may be some ambiguity in its interpretation. In this regard, reference is made to FIG. 5.

As shown in FIG. 5, the user equipment enters the idle state and the logging is started. This is referenced 500. This will start the logging duration timer running and the MDT configuration which is stored will be used. This logging duration is referenced 505. FIG. 5 shows the logging intervals LI. At the end of each logging interval, a measurement sample 501 should be stored. However, as referenced 502, the logging is suspended for one or more of the reasons as discussed previously. As can be seen, a single measurement sample 503 is made after the logging has been suspended as referenced by 502. As reference by 504, the measurement logging is again suspended after the single measurement sample 503.

The logging results are forwarded to the network to provide the operator with radio measurements for further analysis. Based on the results, the network would like to be able to determine the network situation at the time that the MDT operation was scheduled and running. However, since the user equipment was in the idle mode at the time when the logging was performed, the reason for the logging suspension is neither available nor visible to the network or operator analysing the logging results.

Embodiments of the present invention may address this problem.

It has been proposed to add an out of service indicator to the logs to indicate if the user equipment is in an out of service state. However, as there are a number of possible reasons for the suspension of logging, this simple indicator does not provide the reason for the suspension of the logging to the network.

Reference is now made to FIG. 6 which shows a method of an embodiment. In this embodiment, the user equipment may tag one or more measurements with the reason for the suspension of the logging. This may be stored with a corresponding time stamp. This may be recorded when the user equipment suspends or stops logging.

In step T1, the network management entity (NM) configures the logging MDT session. This may be for a particular user equipment. Alternatively or additionally, the network management entity may configure one or more RAN nodes to collect log data randomly from one or more user equipment. The RAN node may be a base station. The base station may be an eNodeB or a NodeB, in some embodiments.

In step T2, the RAN node configures the user equipment to participate in the logging session with a logged measurement configuration message. In some embodiments, the configuration may explicitly request the user equipment to tag the reason for stopping logging. In some embodiments, this may be indicated by the setting of a bit. In alternative embodiments, the user equipment may be configured to automatically provide a reason for the stopping of the logging.

In step T3, the user equipment meets or determines a logging trigger. This may be for example the user equipment entering the idle mode.

In step T4, the user equipment performs logging. This is the performing of one or more measurements and the storing of the associated measurement data.

In step T5, a condition for logging is not met and the user equipment is going to suspend the logging operation. When this occurs, the user equipment will add a tag. The tag will include a reason why the logging is stopped. By way of example only, the stop reason may be selected from one or more of the following:
  any cell selection
  camp on any cell
  other RAT selection
  connection request
  change in connection state
  internal problem
  IDC interference on going
  other.

It should be appreciated that one or more of these reasons may be replaced by one or more other reasons. In some embodiments, the stop reason may be selected from a set of two or more stop reasons. The reasons of the set of stop reasons may be the same and/or different from the options set out above.

In some embodiments, if there is for example an internal problem, the UE may be able to make its own decision to suspend logging based on for example an implementation specific solution. For instance the UE may not log anything because of low battery status, even though other conditions are met.

In some embodiments, the stop reason and a time stamp are appended to the report for the last measurement sample before the stopping of the logging. Alternatively or additionally, this information may be stored separately.

In some embodiments, the user equipment may additionally log the trigger for the reason. For example, the trigger for the any cell selection and/or camp on any cell may be provided.

The any cell selection may be triggered by one or more of the following:
  after initial cell selection, no suitable cell is found;
  after a cell reselection evaluation process is performed after camping on any cell, no acceptable cell is found;
  after cell selection when leaving the connected mode, no acceptable cell is found
  after a cell reselection evaluation process is performed after camping normally, no acceptable cell is found
  no USIM in the user equipment; and
  non access stratum NAS indicates that the registration on the selected PLMN is rejected for a particular reason.

The camping in any cell may be triggered by one or more of the following:
  an acceptable cell been found after any cell selection;
  an acceptable cell has been found after a cell reselection evaluation process; and
  an acceptable cell has been found when leaving the connected mode.

This trigger information may be in any event available and this can be provided in the report.

It should be appreciated that these are examples of possible triggers and in other embodiments, there may be more or less triggers and/or one or more of the triggers may be different.

In some embodiments, triggers for one or more of the reasons may be provided.

In step T6, the user equipment meets a condition for reporting. For example, this may be the user equipment entering the connected state and sending a message with an indication about logged data availability. For example, when the UE becomes active, after being in the idle mode, the UE indicates the availability of stored logged MDT reports to the network.

In step T7, the base station obtains the logged data. This may be in response to a request sent by the base station or may be in response to automatically receiving the report from the user equipment.

In step T8, the base station sends the logged data to the network management entity. This may be optional in some embodiments.

In the embodiments described, logging has been described as taking place during an idle state. In some embodiments additionally or alternatively, there may be logging in a connected mode. There may in some embodiments be two (or more) different logging modes. The different logging modes may be determined by different configurations (for example one for idle, the other for connected). In one example a UE may be configured to perform one or more MDT measurements only in connected state and stop when entering idle. The report may include a stop reason associated with a state change.

In some embodiments, the stop reason may be used for radio link failure reporting for enhancing measurement logging at handover or radio link failure occurrences. Some embodiments may be applied additionally or alternatively to a failed access report. For example in some cases a Radio Link Failure (RLF) Handover Failure (HOF) or Connection Establishment Failed (CEF) Report is report triggered by the appropriate failure events (RLF, HOF, CEF) defined for MDT purposes. These reports may be triggered by a single sample or more than one sample in some embodiments. These reports may be triggered by an event rather than by preconfiguration. In some embodiments the stop reason may be added to the report. Thus, in embodiments, the operator will receive with the measurement results clear reasons as to why the logging ceased. This may improve the effectiveness of the MDT data analysis.

The measurements made by the UE when in the idle mode relate to the serving cell and/or neighboring cells. These measurements may be of any suitable parameter such as signal strength of the respective cell as received at the UE. The signal strength of a reference signal, for example a pilot signal, may be measured. Alternatively or additionally interference information may be determined by the UE. The UE may be arranged to provide one or more types of measurement information for one or more cells.

FIG. 3 depicts an exemplary apparatus 800 for use in a base station. The apparatus may be connected to an antenna 820 for receiving via a downlink and transmitting via an uplink. The apparatus also includes a radio interface 840, which may comprise one of more of the following components such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The apparatus further includes a processor 820 for controlling the base station and for accessing and executing program code stored in memory 825. It should be appreciated that the processor 820 can comprises one or more processors in practice and the memory 825 may be arranged to comprise one or more memories in practice.

Some embodiments may be performed in an LTE system and the eNB may collect the associated measurements. Some embodiments may be performed in a UMTS system and the RNC may collect the associated measurements. Of course in alternative embodiments any other suitable entity may collect the associated measurements. As mentioned previously, the UE may alternatively or additionally collect the associated measurements.

The apparatus of the base station may be configured to receive the messages sent by the UE. One or more of the steps performed by the apparatus of the base station may be performed when one or more associated instructions are run on one or more of the processors. It should be appreciated that the one or more associated instructions may be stored in one or more memories of the base station. The MDT job may be stored in one or more of the memories.

Whilst embodiments have been described in relation to MDT, it should be appreciated that other embodiments may be used with other data collection techniques.

Whilst embodiments have been described in relation to the LTE systems, it should be appreciated that embodiments can be used in conjunction with any other suitable standard. For example, embodiments may be used in a UMTS environment. In this alternative, the messages may be UMTS messages.

It is noted that whilst embodiments may have been described in relation to user equipment or mobile devices such as mobile terminals, embodiments may be applicable to any other suitable type of apparatus suitable for communication via access systems.

A communication device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. In some embodiments, there may be the possibility to download the program code product via a data network.

Some embodiments may be implemented as a chipset, in other words a series of integrated circuits communicating among each other. The chipset may comprise microprocessors arranged to run code, application specific integrated circuits (ASICs), and/or programmable digital signal processors for performing the operations described above.

Embodiments may be practiced in various components such as integrated circuit modules.

The design of integrated circuits may be by a highly automated process. Complex and powerful software tools may be available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   determining at a user equipment that a plurality of measurements are to be made and results of said measurements are to be stored for reporting at a later time;
   determining that said measurements are to be stopped; and
   storing information indicating a reason why said measurements are to be stopped, wherein said reason is selected from one or more of:
      said user equipment is in an "any cell selection" state as defined by 3GPP specifications;
      said user equipment is in a "camped on any cell" state as defined by 3GPP specifications;
      a connection is requested; and
      in-device coexistence interference is present.

2. A method as claimed in claim 1 wherein said information is stored in association with the result of a last measurement before the measurements are to be stopped.

3. A method as claimed in claim 1, wherein said information further comprises information indicating a trigger for said reason.

4. A method as claimed in claim 1, wherein said determining at the user equipment that a plurality of measurements are to be made comprises determining that the user equipment has entered an idle mode.

5. A method as claimed in claim 1, comprising receiving information indicating that said user equipment is to store said information indicating said reason as to why said measurements are to be stopped.

6. A method as claimed in claim 1, comprising reporting said results of said measurements and said stored information to a base station.

7. A method as claimed in claim 1, wherein said measurements comprise minimisation of drive test measurements.

8. A computer readable memory on which is tangibly stored a computer program comprising computer executable code which when run causes the method of claim 1 to be performed.

9. The method according to claim 1, further comprising:
   reporting to a base station the stored results of said plurality of measurements with the information indicating the reason why said measurements were stopped.

10. Apparatus comprising at least one processor and at least one memory including computer code for one or more programs, the at least one memory and the computer code configured, with the at least one processor, to cause the apparatus at least to;
    determine that a plurality of measurements are to be made and results of said measurements are to be stored for reporting at a later time;
    determine that said measurements are to be stopped; and
    store information indicating a reason why said measurements are to be stopped, wherein said reason is selected from one or more of:
       said user equipment is in an "any cell selection" state as defined by 3GPP specifications;
       said user equipment is in a "camped on any cell" state as defined by 3GPP specifications;
       a connection is requested; and
       in-device coexistence interference is present.

11. Apparatus as claimed in claim 10, wherein the at least one memory and the computer code are configured with the at least one processor to cause the apparatus to store said information in association with the result of a last measurement before the measurements are to be stopped.

12. Apparatus as claimed in claim 10, wherein said information further comprises time information.

13. Apparatus as claimed in claim 10, wherein said information further comprises information indicating a trigger for said reason.

14. Apparatus as claimed in claim 10, wherein the at least one memory and the computer code are configured with the at least one processor to cause the apparatus to determine that a plurality of measurements are to be made by determining that a user equipment has entered an idle mode.

15. Apparatus as claimed in claim 10, wherein the at least one memory and the computer code are configured with the at least one processor to cause the apparatus to receive information indicating that a user equipment is to store said information indicating said reason as to why said measurements are to be stopped.

16. Apparatus as claimed in claim 10, wherein the at least one memory and the computer code are configured with the at least one processor to cause the apparatus to report said results of said measurements and said stored information to a base station.

17. Apparatus as claimed in claim 10, wherein said measurements comprise minimisation of drive test measurements.

18. The apparatus according to claim 10, wherein the at least one memory and the computer code are configured with the at least one processor to cause the apparatus further to:

report to a base station the stored results of said plurality of measurements with the information indicating the reason why said measurements were stopped.

19. Apparatus comprising at least one processor and at least one memory including computer code for one or more programs, the at least one memory and the computer code configured, with the at least one processor, to cause the apparatus at least to: receive information about at least one measurement made by a user equipment and information indicating a reason why measurements by said user equipment were stopped, wherein said reason is selected from one or more of:

said user equipment is in an "any cell selection" state as defined by 3GPP specifications;

said user equipment is in a "camped on any cell" state as defined by 3GPP specifications;

a connection is requested; and in-device coexistence interference is present.

* * * * *